United States Patent [19]

Sulfstede et al.

[11] Patent Number: 4,856,286

[45] Date of Patent: Aug. 15, 1989

[54] REFRIGERATION COMPRESSOR DRIVEN BY A DC MOTOR

[75] Inventors: Louis E. Sulfstede; Robert W. Helt; Thomas E. Jensen, all of Tyler, Tex.

[73] Assignee: American Standard Inc., New York, N.Y.

[21] Appl. No.: 240,418

[22] Filed: Sep. 1, 1988

Related U.S. Application Data

[63] Continuation of Ser. No. 127,994, Dec. 2, 1987, abandoned.

[51] Int. Cl.$^4$ ............................................. F25B 1/00
[52] U.S. Cl. ............................................. 62/89; 62/158; 62/180; 62/228.4; 318/811; 417/45
[58] Field of Search ............................ 417/45, 22; 62/228.4, 62/227, 229, 89, 211, 215; 318/309, 599, 254, 138

[56] References Cited

U.S. PATENT DOCUMENTS

| | | | |
|---|---|---|---|
| 3,286,147 | 6/1963 | Parker et al. | 318/138 |
| 3,307,091 | 2/1967 | Johannes | 318/138 |
| 3,324,672 | 6/1967 | Sones et al. | 62/180 |
| 3,339,628 | 9/1967 | Sones et al. | 165/39 |
| 3,599,439 | 8/1971 | Lewis | 62/132 |
| 3,912,993 | 10/1975 | Bereisa, Jr. | 318/230 |
| 3,924,167 | 12/1975 | Clark et al. | 318/254 |
| 3,997,823 | 12/1976 | Machida | 318/138 |
| 4,005,347 | 1/1977 | Erdman | 318/254 |
| 4,006,603 | 2/1977 | Miles | 62/229 |
| 4,027,215 | 5/1977 | Knight et al. | 318/341 |
| 4,090,116 | 5/1978 | Lippitt | 318/345 |
| 4,162,435 | 7/1979 | Wright | 318/138 |
| 4,169,990 | 10/1979 | Lerdman | 318/138 |
| 4,238,717 | 12/1980 | Knight et al. | 318/341 |
| 4,249,116 | 2/1981 | Hieda | 318/254 |
| 4,250,435 | 2/1981 | Alley et al. | 318/138 |
| 4,250,544 | 2/1981 | Alley | 364/110 |
| 4,257,238 | 3/1981 | Kountz et al. | 62/176 |
| 4,282,471 | 8/1981 | Budniak et al. | 318/685 |
| 4,291,368 | 9/1981 | Yarema et al. | 363/41 |
| 4,338,791 | 7/1982 | Stamp, Jr. et al. | 62/160 |
| 4,357,988 | 11/1982 | Hudson et al. | 165/26 |
| 4,364,237 | 12/1982 | Cooper et al. | 62/160 |

(List continued on next page.)

FOREIGN PATENT DOCUMENTS

WO87/04025 7/1987 PCT Int'l Appl. .

OTHER PUBLICATIONS

Erdman et al., Electronically Commutated DC Motors for the Appliance Industry, 9/30/84.
Orth et al., An Electronically Commutated Brushless DC Motor Applied to a Total Artificial Heart, 6/10/81.
Two brochures pertaining to ASHRAE display on 1/20/86.

Primary Examiner—William E. Wayner
Attorney, Agent, or Firm—William J. Beres; David L. Polsley; Robert J. Harter

[57] ABSTRACT

A variable capacity refrigeration system includes a control scheme having three interrelated closed loops. The system includes a refrigeration system controller and at least one variable speed, electronically commutated DC motor driving a compressor. In the first closed loop, the controller supplies a speed command signal to a motor drive which governs the speed of the motor driven compressor. The speed of the compressor varies the system's capacity to condition the temperature of a comfort zone. A temperature sensor in the zone provides a temperature feedback signal to the controller to complete the first closed loop. In the second closed loop, the speed command signal from the controller is varied in response to a speed feedback signal received from a compressor drive which includes both the motor and the motor drive. The third closed loop is between the motor drive and the motor. The motor drive electronically commutates the motor as it delivers an electrical supply to the motor in response to a position feedback signal generated from within the motor. The three loops are interrelated in that the output of the controller responds to feedback from both the temperature sensor and the compressor drive, and the output of the motor drive responds to input from both the motor and the controller.

50 Claims, 3 Drawing Sheets

U.S. PATENT DOCUMENTS

| | | | |
|---|---|---|---|
| 4,368,411 | 1/1983 | Kidd | 318/254 |
| 4,387,421 | 6/1983 | Zach et al. | 364/148 |
| 4,390,826 | 6/1983 | Erdman et al. | 318/439 |
| 4,394,957 | 7/1983 | Newton | 236/46 F |
| 4,415,844 | 11/1983 | Mendenhall et al. | 318/254 |
| 4,429,262 | 1/1984 | Utenick | 318/254 |
| 4,449,079 | 5/1984 | Erdman | 318/138 |
| 4,454,458 | 6/1984 | Holland | 318/254 |
| 4,459,519 | 7/1984 | Erdman | 318/254 |
| 4,492,903 | 1/1985 | Knight et al. | 318/341 |
| 4,494,051 | 1/1985 | Bailey | 318/254 |
| 4,494,052 | 1/1985 | Kelleher et al. | 318/254 |
| 4,495,450 | 1/1985 | Tokizaki et al. | 318/138 |
| 4,507,932 | 4/1985 | Suzuki et al. | 62/180 |
| 4,516,912 | 5/1985 | Leitgeb et al. | 417/45 |
| 4,528,485 | 7/1985 | Boyd, Jr. | 318/138 |
| 4,528,486 | 7/1985 | Flaig et al. | 318/254 |
| 4,532,459 | 7/1985 | Erdman et al. | 318/138 |
| 4,546,293 | 10/1985 | Peterson et al. | 318/254 |
| 4,608,833 | 9/1986 | Kountz | 62/228 |
| 4,623,827 | 11/1986 | Ito | 318/599 |
| 4,636,936 | 1/1987 | Boyd, Jr. et al. | 364/148 |
| 4,642,536 | 2/1987 | Boyd, Jr. et al. | 318/254 |
| 4,653,285 | 3/1987 | Pohl | 62/126 |
| 4,662,185 | 5/1987 | Kobayashi et al. | 62/228 |
| 4,667,480 | 5/1987 | Bessler | 62/228.4 X |
| 4,734,628 | 3/1988 | Bench et al. | 318/309 |

REFRIGERATION COMPRESSOR DRIVEN BY A DC MOTOR

This is a continuation of application Ser. No. 127,994, filed 12/2/87, now abandoned.

TECHNICAL FIELD

The subject invention generally pertains to refrigeration systems having a compressor driven by a variable speed motor, such as a permanent magnetic DC motor that is electronically commmutated.

BACKGROUND OF THE INVENTION

The temperature conditioning demand on many refrigeration systems can vary substantially. This is especially true in residential and commercial applications where air cnditioners and heat pumps experience seasonal changes, changes in humidity, diurnal changes, and variations in occupancy. As a result, several methods have been developed which vary the capacity of the system to meet its demand. One method that emerges as being relatively efficient and versatile varies the capacity by modulating the speed of the system's refrigeration compressor.

Possibly the most common method of varying the speed of a compresor is by way of an inverter driven AC induction motor. The speed of the compressor is varied as the inverter varies the frequency of the current supplied to the compressor's motor. Although inverter driven motors have been in use for many years, several of their drawbacks have not yet been eliminated. Inverters require extensive circuitry that is relatively expensive, and in many cases, they product more line interference than other available drives. Moreover, many inverter driven induction motors are less efficient than variable speed DC motors.

The speed of a conventional DC motor is simply changed by varying the amplitude of its DC supply voltage. The motor includes brushes and a commutator which mechanically commutate the DC supply to become synchronized with the speed of the motor. Unfortunately, a problem arises from commutating the motor using mechanical means. Brushes wear out and are impossible to replace when installed within a hermetic shell of a refrigeration compressor. In addition, electrical arching between the commutator and the brushes generates electrical noise and creates chemical impurities in the refrigerant environment within the hermetic shell.

A permanent magnet brushless DC motor uses electronic commutation to overcome the problems associated with mechanically commutating a motor. Electronic commutation involves replacing the brushes and commutator with an electronic switching means that switches the voltage supplied to the motor leads in response to the rotor's position. The speed of the electronically commutated motor is controlled by varying the DC supply voltage, often with reference to a presumably predictable voltage/speed relationship. This relationship, however, can vary as it is affected by the load applied to the motor. Consequently, speed control schemes based on the presumed voltage/speed relationship are inadequate in systems subject to widely varying loads, such as air conditioners and heat pumps. Yet to directly sense the motor's load, which equals its speed times its torque, involves additional sensors and expense.

SUMMARY OF THE INVENTION

An object of the invention is to provide a refrigeration system having a variable speed compressor driven by an electronically commutated DC motor and controlling the motor's drive in response to the actual speed of the compressor and a temperature error associated with the refrigeration system while disregarding the actual instantaneous load on the motor if its within safe operating limits.

Another object is to integrally incorporate an electronically commutated motor into a temperature conditioning system having a multiple feedback control scheme that includes rotor position feedback, compressor speed feedback, and temperature feedback.

Yet another object of the invention is to avoid the costs and inefficiencies associated with inverter driven induction motors.

A further object is to avoid the electrical noise commonly associated with mechanical commutators of DC motors.

A still further object of the invention is to avoid the use of fault switches and tachometers mounted inside a hermetic shell of a refrigeration compressor driven by an electronically commutated motor.

Another object of the invention is to provide a refrigeration system having both a variable speed compressor and a variable speed fan.

Yet another object is to provide a heat pump system with a variable speed compressor and variable speed indoor fan, and control their speed so that the ratio of fan speed to compressor speed is greater in the cooling mode than in the heating mode.

A further object is to provide a refrigeration system controller that, in response to undesirable rotor position and thermodynamic conditions, repeatedly attempts to start the motor and allows the conditions to change between attempted starts.

Another object is to control the speed of a refrigeration compressor and the speed of an outdoor fan using the same pulse-width mmodulated signal.

Another object of the invention is to control a motor drive by way of a pulse-width modulated control signal that stops the motor if the signal is interrupted, i.e., opened or shorted.

Yet another object is to closely modulate the temperature of a comfort zone by varying the speed of a refrigeration compressor while accurately monitoring its actual speed and also while modulating the flow of refrigerant through an evaporator by means of an expansion valve.

These and other objects of the invention will be provided by a novel refrigeration system.

The capacity of the refrigeration system is varied by varying the speed of a hermetic compressor driven by an electronically commutated, brushless DC motor. The capacity of the system and the motor's speed is modulated by a control scheme having three interrelated closed loops using three feedback signals. The feedback signals represent the actual speed of the motor, the rotational position of the rotor, and the temperature of a zone being conditioned by the refrigeration system.

DESCRIPTION OF THE PREFERRED EMBODIMENT

Figure 1:
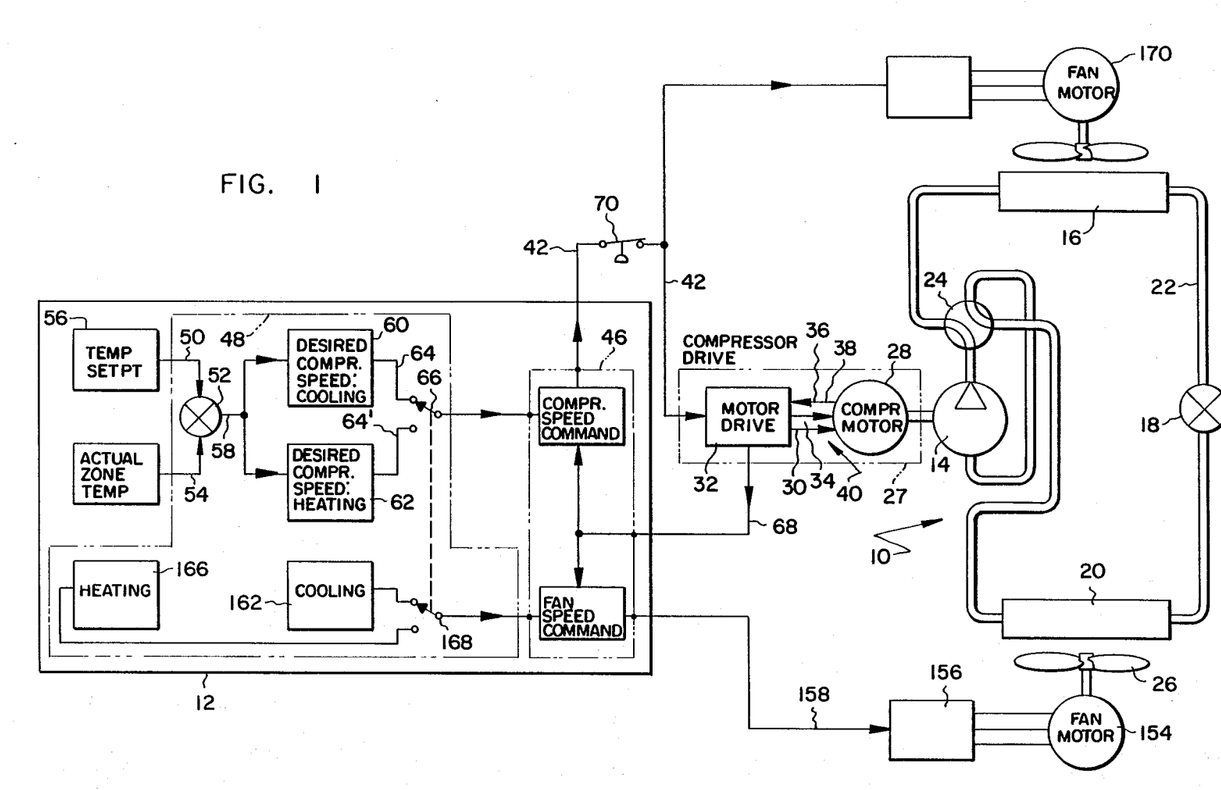
FIG. 1 is a schematic diagram of the subject invention.

FIG. 1 is a schematic diagram illustrating the subject invention which includes a heat pump system 10 controlled by a refrigeration system controller 12. Heat pump 10 includes a variable speed compressor 14, an outdoor heat exchanger 16, an expansion valve 18, and an indoor heat exchanger 20, all of which are connected in series to circulate refrigerant through a hermetically sealed refrigeration circuit 22.

The heat pump system also includes a reversing valve 24 that determines the direction of refrigerant flow through expansion valve 18 and both heat exchangers 16 and 20. The direction of flow determines whether the system operates in a cooling or heating mode. Valve 24 places the system in the cooling mode when the valve is positioned as shown in FIG. 1. In other words, the indoor heat exchanger 20 functions as an evaporator and in conjunction with an indoor fan 26 provides a cooling effect on a comfort zone. To provide a heating effect, valve 24 is rotated 90° from the position shown causing heat exchanger 16 to function as an evaporator and heat exchanger 20 to function as a condenser which places system 10 in the heating mode.

Although the system shown in FIG. 1 is a heat pump, it is within the scope of the invention to use a refrigeration system that operates in a cooling only mode, thereby eliminating the need for reversing valve 24. Numerous other variations would also be within the scope of the invention, such as reversing the rotational direction of a suitable rotary compressor instead of using a reversing valve, using a constant versus a variable speed indoor fan, or replacing the expansion valve with any one of a variety of expansion devices such as a capillary tube or an orifice. An expansion value is preferred, however, since it can modulate flow in response to the refrigerant's changing thermodynamic conditions such as pressure or temperature. It should also be noted that the refrigeration circuit 22 shown in FIG. 1 is generally schematic in nature which is the reason only one expansion device is shown rather than the usual arrangement of two expansion devices with their appropriate bypass check valve.

The basic operating principles of heat pumps and other refrigeration circuits are well known to those skilled in the art, and so the specifics of their cycle will not be explained in great detail. It should be noted, however, that one distinguishing feature of the invention is that the temperature conditioning capacity of system 10 is modulated by varying the compressor's capacity to compress refrigerant. This is accomplished by varying the speed of compressor 14.

Compressor 14 is driven by a variable speed compressor drive 27 which comprises a permanent magnet, brushless DC motor 28 that receives its electrical supply 30 from a motor drive 32. The purpose of motor drive 32 is to electronically commutate motor 28 and also to vary its speed by varying the voltage and frequency of the motor's electrical speed 30. As with conventional DC motors, the speed of motor 28 increases with the amplitude (RMS value) of its supply voltage 34. Motor drive 32 commutates motor 28 by alternating the relative polarity of the motor's supply voltage 34 and synchronizing the polarity changes with the rotational position of the motor's rotor. Commutating motor 28 is done electronically in response to a rotor position sensor disposed within the motor. Although the position sensor could be any rotor position sensing means for providing a rotor position feedback signal such as an electromechanical or proximity type switch, in the preferred embodiment, a position feedback signal 36 is generated from within motor 28 by way of a de-energized motor winding 38. This is depicted by the three motor supply leads 40, of which only two are energized at a time. The de-energized winding 38 that carries the position feedback signal 36 changes sequentially among the three leads 40 as the rotor rotates. Employing this method minimizes the number of electrical leads that must pass through the compressor's hermetic shell. An exemplary motor drive 32 and an explanation of its basic operating principles such as its means for sensing rotor position and its means for varying the motor speed is disclosed in U.S. Pat. No. 4,162,435 which is specifically incorporated by reference herein. A specific motor drive 32 used in one embodiment of the invention is the General Electric Model X-8794700AHG03.

Motor drive 32 electronically commutates motor 28 in response to the rotor position feedback signal 36, and controls the the motor's supply voltage 34 in response to a relatively low voltage speed command signal 42. Signal 42 is electrically isolated from supply voltage 34 by way of optocoupler. Speed command signal 42, which has a DC voltage of constant amplitude between approximately 5 and 24 volts and variable duty cycle, is generated by controller 12 which comprises a microcomputer circuit 46 and an interface circuit 48. Although a Mitsubishi 5743 microcomputer is used in one embodiment of the invention, an Intel 8751 and an 8022 have also been used successfully, and a variety of other microcomputers would also be acceptable. Circuit 48 provides an interface between microcomputer 46 and a variety of input signals such as a temperature setpoint signal 50.

Interface circuit 48 is a relatively uncomplicated circuit that should be easily understood with reference to its control diagram shown in FIG. 1. Circuit 48 includes a combination of discrete and I.C. coponents; however, it should be apparent to those skilled in the art that essentially the same circuit can be reproduced using discrete electronic components alone. Circuit 48 includes a summing junction 52 that compares the actual temperature of the comfort zone to a setpoint temperature representative of a desired zone temperature. In the preferred embodiment, the zone temperature is supplied to the interface circuit 48 by way of a zone temperature feedback signal 54 generated by a thermistor associated with the comfort zone, and a digital keyboard 56 is used as the means for providing the temperature setpoint signal 50. However, it should be clear to those skilled in the art that there is a myriad of equally acceptable alternatives for sensing the zone temperature and for providing a temperature setpoint signal.

Upon comparing the zone temperature to its setpoint, summing junction 52 generates a temperature error signal 58 representing the difference between the zone temperature and its setpoint. The temperature error signal 58 is conveyed to transfer functions 60 and 62, and based on error signal 58, the functions generate a desired compressor speed signal 64 and 64' for cooling and heating respectively. The specifics of the transfer function 60 and 62 are simply matter of design choice and would depend on the specific refrigeration system installation. A simple example of an acceptable transfer function would be a proportional control where the temperature error 58 is multiplied by a gain and the resulting product is added to a predetermined constant. Other acceptable transfer functions include integral control, "PID", look-up tables, or as in the preferred embodiment, proportion plus integral control.

Depending on the position of a mode select switch 66, one of the desired compressor speed signals 64 or 64' is conveyed as a pulse-width modulated (PWM) input signal to the microcomputer circuit 46. Microcomputer 46 also receives a speed feedback signal 68 that represents the actual speed of compressor 14. There are a variety of means for sensing the speed of a compressor and generating a feedback signal in response to it. One example would be by way of a generator or an alternator type tachometer coupled to either the compressor or its motor. The tachometer could generate a voltage whose amplitude or frequency is proportional to the speed of the compressor. Another example would be a digital tachometer that counts rotor revolutions over time by using an optical sensor or some other type of proximity sensor such as those employing the Hall effect. The specific method used in the preferred embodiment involves counting, over a period of time, electrical pulses generated from within the compressor drive 27 as drive 27 switches electrical supply 30 among the motor's supply leads 40.

Figure 2:
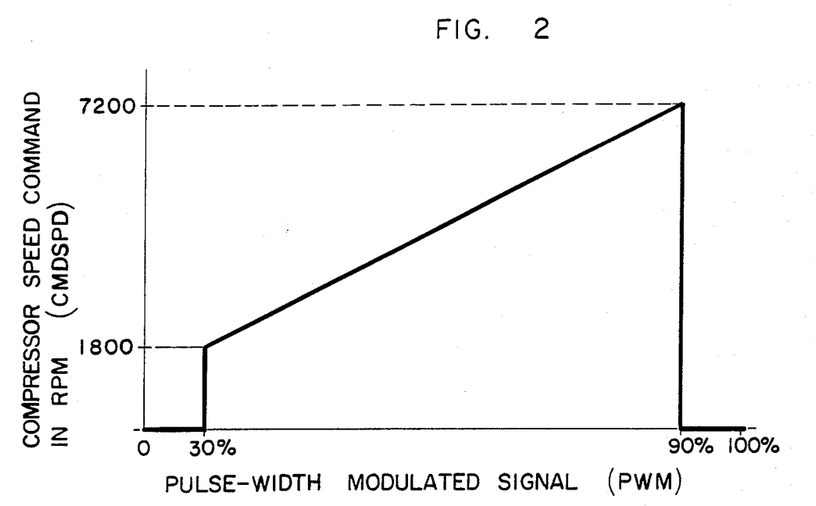
FIG. 2 is a graph showing the relationship between compressor speed and its controlling PWM signal.

In response to the desired compressor speed signal 64 or 64' and the compressor speed feedback signal 68, controller 12 generates the PWM speed command signal 42 which controls the speed of the compresor 14 according to the function shown in FIG. 2. It can be seen from the figure that the function is discontinuous in that the speed command 42 drops to zero when the resulting pulse width is either less than a predetermined minimum of 30% or greater than a predetermined maximum of 90%. In addition, compressor 14 stops when the electrical leads carrying the speed command signal 42 are shorted (to high or ground) or disconnected. This feature not only provides a simple means for stopping the compressor but also provides a convenient location to install series connected trip switches 70 that stop the compressor in response to extreme temperatures, pressures, or current. Temperatures that can be monitored include, but are not limited to, the exterior surface of the compressor shell, a terminal box attached to the compressor shell, and electronic devices included in motor drive 32. It should be noted, however, that an alternate location of trip switch 70 is on the speed feedback line 68 which is also a low voltage line that carries between 5 and 24 volts. It should also be noted that the 30% and 90% values can be changed to any predetermined values between 0% and 100%.

Figure 3:
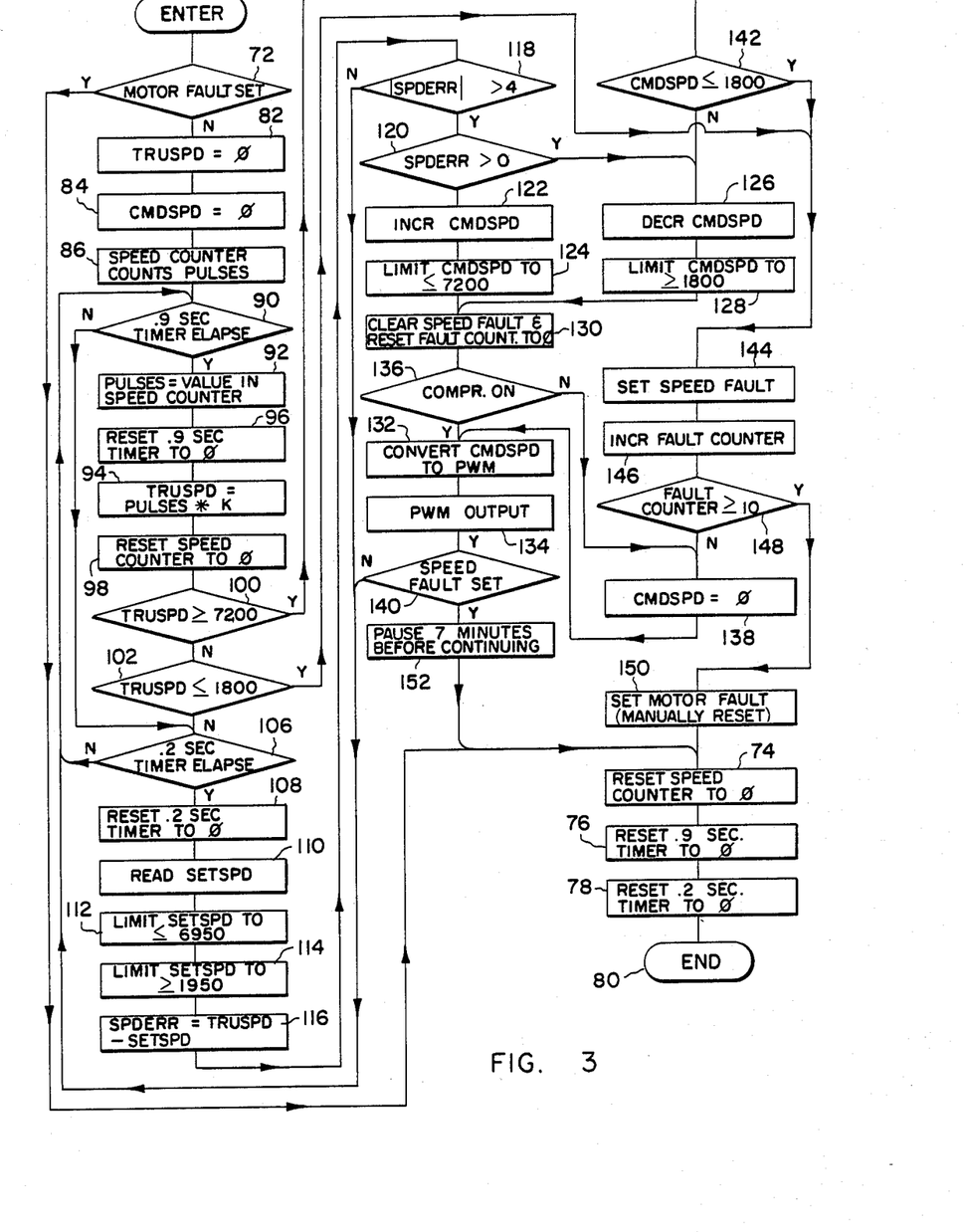
FIG. 3 is the control algorithm of the subject invention.

To derive speed command signal 42, controller 12 operates according to the algorithm shown in FIG. 3. Upon entering the algorithm, control block 72 determines whether a motor fault exists. If one exists, control is directed toward the end of the flow chart where miscellaneous times and a counter are reset to zero at blocks 74, 76, and 78. Upon reaching the end 80 of the program, an interrupt is automatically initiated to re-enter the program at block 72 again. This cycle repeats until the motor fault is manually reset or cleared. If the motor fault is not set, initial speed values of zero are assigned to the variables TRUSPD and CMDSPD by blocks 82 and 84. TRUSPD is a digital value representing the actual speed of compressor 14 and CMDSPD corresponds to the speed command 42 that is delivered to motor drive 32 which in turn controls the speed of the compressor's motor 28. The next block 86 initiates the speed counter which continuously counts the pulses that are provided by motor drive 32 as it commutates motor 28. The pulses, being generated at a frequency proportional to the speed of motor 28, represents the motor speed feedback signal 68. The compressor speed (TRUSPD) is determined by counting pulses over a 0.9 second time period as indicated by decision block 90. In block 92, the variable "PULSES" is assigned the value representing the number of pulses counted in the last 0.9 second interval. This value is then converted to speed (TRUSPD) in block 94. Blocks 96 and 98 reset the 0.9 second timer and the speed counter to zero, and the speed counter automatically begins counting another set of pulses to determine the next compressor speed reading.

Once TRUSPD has been determined, decision blocks 100 and 102 determine if the compressor speed is within the predetermined speed limits of 1800 and 7200 RPM. If not, a speed problem exists and corrective action is taken either by blocks 142, 144, 146, 148 and 150, or by blocks 142 and 126 depending on whether the extreme speed conditoin is characterized by the compressor speed reaching the upper or lower speed limit as will be explained later. Assuming TRUSPD is within 1800 to 7200 RPM, decision block 106 allows speed control action to be taken every 0.2 seconds, i.e., a new command speed (CMDSPD) is computed and supplied to motor drive 32 to vary the speed of motor 28 every 0.2 seconds. After each 0.2 second interval, the 0.2 second timer is reset to zero by block 108, and microcomputer circuit 46 reads the desired speed signal 64 or 64' provided by interface circuit 48 and assigns its digital value to the variable SETSPD in block 110. Blocks 112 and 114 limit the value of SETSPD to lie within the range of 1950 and 6950 RPM. Block 116 assigns the variable SPDERR to equal TRUSPD minus SETSPD which represents the difference between the actual compressor speed, TRUSPD, and the desired speed, SETSPD. If SPDERR lies within an acceptable range, or deadband, no change in speed control is taken as indicated by decision block 118 which has a deadband of +4 to −4. Beyond the deadband, CMDSPD is appropriately incremented or decremented in discrete steps, but its new value is limited to within speed limits which are stored as digital values corresponding to 1800 and 7200 RPM. Computing the new value of CMDSPD is represented by control blocks 120, 122, 124, 126, and 128 which subsequently brings the control to block 130. Block 130 clears a speed fault and resets a fault counter to zero. Both the speed fault and counter will be explained later. Before the computed CMDSPD is converted to PWM signal 42 by block 132 and delivered to motor drive 32 as a result of block 134, controller checks to see if compressor 28 should actually be operating. This is accomplished by decision block 136 which determines whether an external "COMPRESSOR ON" signal has been supplied to microcomputer 46. If the COMPRESSOR ON signal is not present, CMDSPD is changed to zero at block 138, and the compresor is commanded to stop due to blocks 138, 132, and 134. The control subsequently returns to block 90 via decision block 140, provided no speed faults exists. If a COMPRESSOR ON signal exists, CMDSPD retains its value computed by blocks 122, 124, 126, and 128,, and CMDSPD is converted to a PWM signal 42 that is delivered to motor drive 32 as indicated by blocks 132 and 134. Control is then returned to block 90, provided no speed fault exists.

As mentioned earlier, a speed problem is determined by decision blocks 100 and 102. If an overspeed condition occurs, as recognized by decision block 100, decision block 142 will direct the control to attempt corrective action, i.e., reduce the compressor speed by way of control block 126. However, if the attempt is unsuccessful as determined by subsequent speed checks which show an overspeed condition still exits even though CMDSPD has been reduced to its lowest design limit of 1800 RPM, then decision block 142 directs the control to block 144. Block 144 sets a speed fault, and block 146 increments a speed fault counter. If the value in the counter exceeds a predetermined limit, of say 10, as indicated by block 148, block 150 sets a motor fault which stops compressor 28. The program is re-entered by way of blocks 74, 76, 78, and 80 which initiates another interrupt. However, the compressor will not restart until the motor fault is manually reset. If the value in the fault counter is less than 10, block 138 assigns the value of zero to CMDSPD which also stops the compressor, but only for a predetermined time delay of 7 minutes, as shown by blocks 140 and 152. After 7 minutes, the compressor automatically attempts to restart provided a COMPRESSOR ON signal is still present.

If an underspeed condition exists as determined by decision block 102, no attempt is made to increase the speed and the compressor is shut down via blocks 144, 146, 148, 138, 132, and 134 or via blocks 144, 146, 148 and 150, depending on decision block 148. An underspeed condition forces the compressor to shut down immediatey to avoid possible damage caused by inadequate lubrication.

It should be appreciated by those skilled in the art that the above-described algorithm explains the overall control scheme of the preferred embodkent, and a variety or hardware and software variations would still be well within the scope of the invention. For example, many portions of the algorithm can be readily separated from the microcomputer itself and incorporated in peripheral circuits such as the motor fault generally comprising blocks 144, 146, 148, and 150; 7 minute time delay of block 152; converting a digital signal to a pulse-width modulated signal, and vise-versa, as accomplished by blocks 110 and 134; in addition, the interrupt which initiates the control algorithm could be externally provided, e.g., a control algorithm associated with interface circuit 48 could provide the interrupt for the algorithm of FIG. 3 which in turn could do the same for circuit 48. It should also be obvious, and in some cases desirable, to change many of the predetermined digital values such as those defined in blocks 82, 84, 90, 100, 102, 106, 112, 114, 118 and 148.

The control scheme described above can be overridden during a diagnostic mode of the refrigeration system. In the diagnostic mode, a service technician removes signal 42, normally provided by controller 12, and substitutes a low voltage AC signal (less than 25 volts) from any readily available source. A diode, in series with motor drive 32, converts the AC signal to a pulsed DC signal having a constant duty cycle of approximately 50%.

Figure 4:
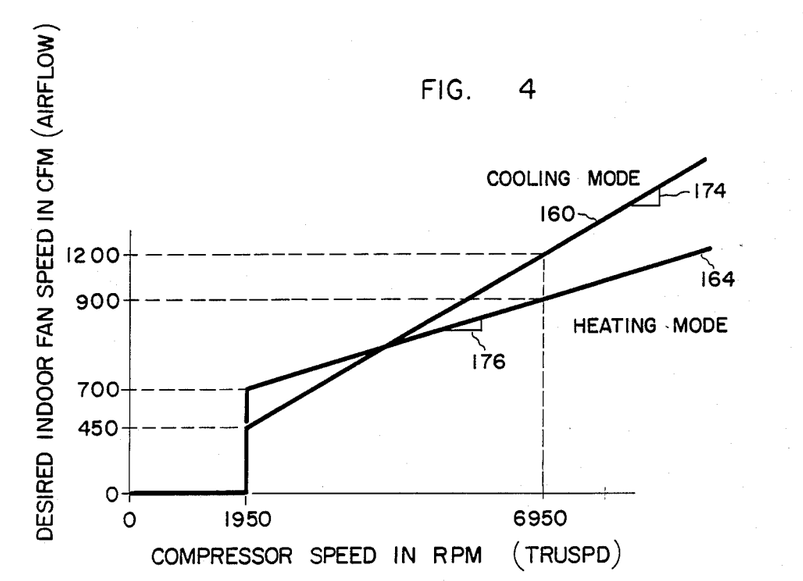
FIG. 4 shows the relationship between indoor fan speed and compressor speed in both the cooling and heating mode.

Referring to FIG. 1, the preferred embodiment of the invention can be modified by driving the variable speed indoor fan 26 with a second brushless DC motor 154 similiar to compressor motor 28. Fan motor 154 can be electronically commutated by a motor drive 156 to vary its speed in response to a second PWM speed command signal 158 provided by controller 12. The speed of fan 26 can be controlled as a function of the compressor speed, as indicated in FIG. 4. A cooling mode function 160 (FIG. 4) is provided by an input 162 (FIG. 1) and a heating mode function 164 (FIG. 4) is provided an input 166 (FIG. 1). A mode select switch 168 determines which function 160 or 164 is used to compute the fan speed command signal 158 (analagous to the compressor's CMDSPD) to the motor drive 156.

Referring to FIG. 4, functions 160 and 164 purposely have different slopes, with slope 174 being greater than slope 176. In other words, the ratio of the fan speed to compressor speed is greater in the cooling mode than in the heating mode. This provides a generally constant ratio of indoor fan air flow rate to refrigeration capacity (constant ratio of CFM/TON) in the cooling mode, and provides a generally constant indoor air flow temperature in the heating mode.

As shown in FIG. 1, the basic refrigeration system can be further modified to include a variable speed outdoor fan 170 whose speed is controlled in response to the PWM speed command signal 42, which is the same signal used to control the speed of compressor 14.

Although the invention is described with respect to a preferred embodiment, modifications thereto will be apparent to those skilled in the art. Therefore, the scope of the invention is to be determined by reference to the claims which follow.

We claim:
1. A refrigeration system comprising:
(a) a compressor disposed in a hermetic shell, an outdoor heat exchanger, an expansion device, and an indoor heat exchanger all of which are connected in series to comprise a hermetically sealed refrigeraton circuit for conditioning the temperature of a comfort zone;
(b) a refrigeration system controller than generates a pulse-width modulated speed command signal in response to a zone temperature setpoint and the temperature of said comfort zone;
(c) a variable speed brushless DC motor coupled to said compressor and controlled in response to said pulse-width modulated speed command signal such that;
  i. said motor de-energizes in response to a pulse width of said speed command signal being within a predetermined lower pulse width range,
  ii. said motor de-energizes in response to said pulse width of said speed command signal being within a predetermined upper pulse width range, and
  iii. the speed of said motor varies as a function of said pulse width when said pulse width of said speed command signal is within a predetermined intermediate range that lies between said upper and said lower range.

2. The refrigeration system as recited in claim 1, further comprising a variable speed indoor fan associated with said indoor heat exchanger and having a speed that varies in response to a second pulse-width modulated speed command signal.

3. The refrigeration system as recited in claim 2, wherein said system is selectively operative in a heating or cooling mode and said controller controls the speed of said compressor motor and the speed of said indoor fan to provide a ratio of fan speed to compressor speed that is greater in said cooling mode than in said heating mode.

4. The refrigeration system as recited in claim 1 wherein said pulse-width modulated speed command signal is a DC signal.

5. The refrigeration system as recited in claim 4, wherein said system is selectively operative in a diagnostic mode, and said compressor motor is controlled in respone to an AC speed command signal when said refrigeration system is in said diagnostic mode.

6. The refrigeration system as recited in claim 1, wherein said pulse-width modulated speed command signal is conveyed across an optocoupler.

7. The refrigeration system as recited in claim 1, wherein said pulse-width modulated speed command signal is conveyed through a trip switch that opens in response to a fault occurring in said refrigeration system.

8. The refrigeration system as recited in claim 2, further comprising a variable speed outdoor fan whose speed varies in response to said pulse-width modulated signal.

9. A refrigeration system comprising:
(a) a compressor disposed in a hermetic shell, an outdoor heat exchanger, an expansion device, and an indoor heat exchanger all of which are connected in series to comprise a hermetically sealed refrigeration circuit for conditioning the temperature of a comfort zone;
(b) a temperature sensor for providinng a temperature feedback signal representing the temperature of said zone;
(c) means for providing a temperature setpoint signal representing a desired temperature of said zone;
(d) speed sensing means for sensing the actual rotational speed of variable speed DC electric motor that drives said compressor and for providing a motor speed feedback signal which represents the motor's actual rotational speed;
(e) means for determining a desired compressor speed based upon said temperature feedback signal and said temperature setpoint signal;
(f) means for generating a pulse-width modulated signal having a pulse width that varires to control the speed of said motor to minimize the difference between said desired speed and said actual speed;
(g) position sensing means for sensing the rotational position of a rotor of said motor by sensing a position feedback signal generated by a de-energized winding of said motor; and
(h) a motor drive that conveys an electrical supply to said motor in response to said pulse-width modulated signal and electronically commutates said motor in response to said rotor position feedback signal.

10. The refrigeration system as recited in claim 9, wherein said motor drive varies the speed of said motor in response to said pulse-width modulated signal and electronically commmutates said motor n response to said rotor position feedback signal.

11. The refrigeration system as recited in claim 9, wherein said motor drive stops said motor by interrupting its electrical supply when the pulse width of said pulse-width modulated signal is less than a predetermined minimum width.

12. The refrigeration system as recited in claim 9, wherein said motor drive stops said motor by interrupting its electrical supply wnen the pulse width of said pulse-width modulated signal is greater than a predetermined maximum width.

13. The refrigeration system as recited in claim 9, wherein said pulse-width modulated signal is isolated from the motor's electrical supply by way of an optocoupler.

14. The refrigeration system as recited in claim 9, further comprising a trip switch connected to a low voltage line that is separate from said motor's electrical supply for interrupting said pulse-width modulated signal in response to a fault occurring in said refrigeration system.

15. The refrigeration system as recited in claim 14, wherein said fault is an occurrence of refrigerant pressure reaching a predetermined pressure limit.

16. The refrigeration system as recited in claim 14, wherein said trip switch is a temperature responsive switch that opens in response to sensing a predetermined temperature limit.

17. The refrigeration system as recited in claim 14, wherein said fault is defined as the current of the motor's electrical supply exceeding a predetermined current limit.

18. The refrigeration system as recited in claim 9, wherein said system contains a refrigerant having a thermodynamic state may vary throughout said system which further comprises means for attempting to start said motor driven compressor but discontinues the attempt after a predetermined period of time if said motor doesn't continue rotating as indicated by said speed sensing means, and for automaticaly waiting another predetermined period before subsequent attempts at starting said motor, thereby repeatedly attempting to start said motor and allowing said thermodynamic state of said refrigerant and the rotational position of said rotor to change between unsuccessful start attempts until said motor continues rotating or until the number of unsuccessful start attempts reaches a predetermined number indicative of a system fault, whichever occurs first.

19. The refrigeration system as recited in claim 9, further comprising a variable speed fan associated with said indoor heat exchanger, said fan being drive by a brushless DC electric motor whose speed varies in response to a second-pulse width modulated signal.

20. The refrigeration system as recited in claim 9, further comprising a variable speed outdoor fan whose speed varies in response to said pulse-width modulated signal.

21. The refrigeration system as recited in claim 19, wherein said system is selectively operative in a heating or a cooling mode and the speed of said fan and said compressor provides a ratio of fan speed to compressor speed that is greater in said cooling mode than in said heating mode.

22. A method of controlling a refrigeration system comprising the steps of:
(a) sensing the temperature of a comfort zone;
(b) determining a temperature error by comparing the temperature of the comfort zone to a desired zone temperature;
(c) deriving a desired compressor speed as a function of the temperature error;

(d) sensing an actual speed of a refrigeration compressor driven by a variable speed, brushless DC electric motor;

(e) determining the rotational position of a rotor of the DC motor by sensing a position feedback signal generated by a de-energized winding of the motor;

(f) electronically commutating the motor in response to the rotor's rotational position;

(g) comparing a first digital value representing the desired compressor speed to a second digital value representing the actual compressor speed, thereby deriving a digital command speed value that commands the compressor to operate at speeds of discrete finite increments;

(h) storing, in a microcomputer, a third digital value representing a predetermined speed limit;

(i) recognizing, should it occur, an extreme speed condition characterized by the actual speed of the motor reaching the predetermined speed limit;

(j) in the absence of an extreme speed condition, changing the speed of the compressor by changing the digital command speed value in discrete finite increments;

(k) if an extreme speed condition exists, attempting to correct the extreme speed condition by changing the digital command speed value in discrete increments; and (l) de-energizing the motor if the step of attempting to correct the extreme speed condition is unsuccessful.

23. The method as recited in claim 22, further comprising the step of employing an expansion valve for modulating the flow of a refrigerant through the refrigeration system in response to a thermodynamic condition of the refrigerant.

24. The method as recited in claim 22, wherein the step of sensing the actual speed of the compressor involves counting over a period of time the number of times an electrical supply conveyed to the motor switches among a plurality of motor supply leads as a result of electronically commutating the motor.

25. The method as recited in claim 22, further comprising the step of converting the digital command speed value to a pulse-width modulated signal so that the speed of the compressor changes in response to the pulse-width modulated signal.

26. The method as recited in claim 25, wherein the motor is de-energized when the pulse-width of the pulse-width modulated signal is less than a predetermined minimum pulse-width.

27. The method as recited in claim 25, wherein the motor is de-energized when the pulse-width of the pulse-width modulated signal is greater than a predetermined maximum pulse-width.

28. The method as recited in claim 23, wherein the pulse-width modulated signal is isolated from the motor's electrical supply by way of an optocoupler.

29. The method as recited in claim 22, further comprising the step of interrupting the motor's electric supply with a trip switch responsive to a fault occurring in the refrigeration system, said trip switch being connected to a low voltage line having a voltage that is lower than the voltage of the motor's electric supply.

30. The method as recited in claim 29, wherein the trip switch opens in response to sensing a predetermined temperature limit.

31. The method as recited in claim 29, wherein the fault is defined as a refrigerant pressure of the refrigeration system reaching a predetermined pressure limit.

32. The method as recited in claim 29, wherein the fault is defined as the current of the motor's electrical supply exceeding a predetermined current limit.

33. The method as recited in claim 22, wherein the refrigeration system contains a refrigerant having a thermodynamic state may vary throughout the system, and further comprising the step of attempting to start the motor driven compressor but discontinuing the attempt after a predetermined period of time if the motor doesn't continue rotating as indicated by the step of sensing the speed, and automatically waiting another predetermined period before subsequent attempts at starting the motor, thereby repeatedly attempting to start the motor driven compressor and allowing the thermodynamic state of the refrigerant and the rotational position of the motor to change between unsuccessful starting attempts until the number of unsuccessful start attempts reaches a predetermined number indicative of a system fault, whichever occurs first.

34. The method as recited in claim 25, wherein the refrigeration system includes an indoor fan associated with an indoor heat exchanger, and further comprising the step of varying the speed of the fan in response to a second pulse-width modulated signal.

35. The method as recited in claim 34, wherein the fan is driven by a second brushless DC motor.

36. The method as recited in claim 34, wherein the refrigeration system is selectively operative in a heating or coolind mode, and further comprising the steps of varying the speed of the compressor and the fan so that a ratio of fan speed to compressor speed is greater in the cooling mode than in the heating mode.

37. The method as recited in claim 25, wherein the refrigeration system includes an outdoor fan, and further comprising the step of varying the speed of the outdoor fan in response to said pulse-width modulated signal.

38. The method as recited in claim 22, wherein said step of attempting to correct the extreme speed condition involves attempting to decrease the speed of the motor to a speed below the predetermined speed limit.

39. The method as recited in claim 22, wherein said step of attempting to correct the extreme speed condition involves attempting to increase the speed of the motor to a speed greater than the predetermined speed limit.

40. A refrigeration system operating under three interrelates closed loops of control comprising:

(a) an expansion device for modulating a flow of refrigerant through a heat exchanger functioning as an evaporator;

(b) an indoor heat exchanger connected in series with said expansion device and cooperating with an indoor fan for conditioning the temperature of a comfort zone;

(c) an outdoor heat exchanger connected in series with said indoor heat exchanger;

(d) a hermetically sealed refrigeration compression whose speed effects its capacity to compress a refrigerant that is conveyed in series flow through said indoor heat exchanger;

(e) a variable speed compressor drive connected to drive said compressor at various speeds to provide various compressor capacities, said compressor drive comprising a brushless DC motor that is electrically connected to a motor drive;

(f) a temperature sensor for sensing the temperature of said comfort zone;

(g) means for providing a desired temperature setpoint for said comfort zone;

(h) means for determining in a desired compressor speed based upon the temperature of said comfort zone and said desired temperature setpoint;

(i) means for sensing the actual speed of said compressor and for generating a speed feedback signal representing the actual speed of said compressor;

(j) a controller electrically connected to said compressor drive, said temperature sensor, and said means for setting a desired setpoint temperature, said controller having means for generating a pulse-width modulated speed command signal whose pulse width varies to control the speed of said motor to minimize the difference between said desired speed and said actual speed, said controller operating within a control scheme that includes a first, second, and third closed loop that interrelates said controller, said motor drive, said DC motor, and said temperature sensor, i. said first closed loop comprising: said speed command signal generated by said controller and conveyed to said compressor drive;

an electrical supply delivered to said DC motor and having a voltage and frequency that varies in response to said speed command signal, whereby the speed of said compressor varies in response to said speed command signal;

a temperature conditioning effect produced by said refrigeration system and imposed on said comfort zone to modulate its temperature by way of said indoor heat exchanger cooperating with said indoor fan, said temperature conditioning effect increasing with the speed of said compressor;

a zone temperature feedback signal representing the temperature of said zone and produced by said temperature sensor, said zone temperature feedback signal being conveyed back to said controller to affect said speed command signal, thereby closing said first closed loop;

ii. said second closed loop comprising said speed command signal which further varies as a function of said speed feedback signal that represents the actual speed of said compressor, said speed feedback signal being produced by said compressor drive and conveyed back to said controller, thereby closing said second closed loop and iii. said third closed loop comprising said electrical supply conveyed from said motor drive to said motor in response to a rotor position feedback signal that indicates the rotational position of a rotor of said motor, said rotor position feedback signal being generated from within said motor and conveyed back to said motor drive, thereby closing said third closed loop.

41. The refrigeration system as recited in claim 40, wherein said speed command signal is a pulse-width modulated signal.

42. The refrigeration system as recited in claim 41, wherein said motor is de-energized when the pulse width of said pulse-width modulated signal is less than a predetermined minimum pulse-width.

43. The refrigeration system as recited in claim 41, wherein said motor is de-energized when the pulse width of said pulse-width modulated signal is greater than a predetermined maximum pulse width.

44. The refrigeration system as recited in claim 41, further comprising an optocoupler that isolates said pulse-width modulated signal from said electrical supply delivered to said motor.

45. The referigeration system as recited in claim 40 further comprising a trip switch connected to a low voltage line that is separate from said electrical supply for de-energizing said motor in response to a fault occuring in said refrigeration system.

46. The refrigeration system as recited in claim 45, wherein said trip switch is connected to convey said speed command signal.

47. The refrigeration system as recited in claim 45, wherein said trip switch is connected to convey said speed feedback signal.

48. The refrigeration system as recited in claim 40, wherein said controller is adapted to attempt to start said compressor but discontinues its attempt after a predetermined period of time if said motor doesn't continue rotating as indicated by sadi speed feedback signal, said controller being further adapted to automatically wait another predetermined period before subsequent attemtps at starting said compressor, thereby jogging said motor and allowing the thermodynamic condition of said refrigerant and the rotational position of said rotor to change between unsuccessful start attempts until said motor rotates continuously or until the number of unsuccessful start attempts reaches a predetermined number indicative of a system fault, whichever occurs first.

49. The refrigeration system as recited in claim 40, wherein said indoor fan is driven by a second brushless DC electric motor whose speed varies in response to a second pulse-width modulated signal.

50. The refrigeration system as recited in claim 49, wherein said refrigeration system is selectively operative in a heating or cooling mode and the speed of said fan and said compressor is controlled to provide a ratio of fan speed to compressor speed that is greater in said cooling mode than in said heating mode.

* * * * *

UNITED STATES PATENT AND TRADEMARK OFFICE
CERTIFICATE OF CORRECTION

PATENT NO. : 4,856,286

DATED : August 15, 1989

INVENTOR(S) : Louis E. Sulfstede, Robert W. Helt and Thomas E. Jensen

It is certified that error appears in the above-identified patent and that said Letters Patent is hereby corrected as shown below:

In the Specification:

Column 1, line 18, "cnditioners" should be --conditioners--.

Column 1, line 34, "product" should be --produce--.

Column 1, line 47, "arching" should be --arcing--.

Column 2, line 42, "mmodulated" should be --modulated--.

Column 3, line 43, "value" should be --valve--.

Column 3, line 51, "valve" should be --valves--.

Column 5, line 64, "times" should be --timers--.

Column 7, line 15, "exits" should be --exists--.

Column 7, line 38, "immediatey" should be --immediately--.

Column 7, line 42, "embodkent" should be --embodiment--.

In the Claims:

Claim 1, column 8, line 43, "than" should be --that--.

Claim 5, column 9, line 12, "respone" should be --response--.

UNITED STATES PATENT AND TRADEMARK OFFICE
CERTIFICATE OF CORRECTION

PATENT NO. : 4,856,286

DATED : August 15, 1989

INVENTOR(S) : Louis E. Sulfstede, Robert W. Helt and Thomas E. Jensen

It is certified that error appears in the above-identified patent and that said Letters Patent is hereby corrected as shown below:

In the Claims:

Claim 9, column 9, line 33, "providinng" should be --providing--.

Claim 9, column 9, line 47, "varires" should be --varies--.

Claim 10, column 9, line 62, "motor n" should be --motor in--.

Claim 12, column 10, line 3, "wnen" should be --when--.

Claim 19, column 10, line 47, "drive" should be --driven--.

Claim 28, column 11, line 56, "claim 23" should be --claim 25--.

Claim 36, column 12, line 33, "coolind" should be --cooling--.

Claim 36, column 12, line 33, "steps" should be --step--.

Claim 40, column 12, lines 51-52, "interrelates" should be --interrelated--.

Claim 40, column 12, lines 62, "compression" should be --compressor--.

UNITED STATES PATENT AND TRADEMARK OFFICE
CERTIFICATE OF CORRECTION

PATENT NO. : 4,856,286

DATED : August 15, 1989

INVENTOR(S) : Louis E. Sulfstede, Robert W. Helt and Thomas E. Jensen

It is certified that error appears in the above-identified patent and that said Letters Patent is hereby corrected as shown below:

In the Claims:

Claim 40, column 13, line 25, a new paragraph should start after "comprising:"

Claim 48, column 14, line 35, "sadi" should be --said--.

Claim 48, column 14, line 38, "attemtps" should be --attempts--.

Signed and Sealed this

Twelfth Day of June, 1990

Attest:

HARRY F. MANBECK, JR.

*Attesting Officer*  *Commissioner of Patents and Trademarks*